United States Patent [19]
Hamilton et al.

[11] Patent Number: 5,979,431
[45] Date of Patent: Nov. 9, 1999

[54] PORTABLE STOVE

[76] Inventors: Kenneth R. Hamilton; Lawrence Matthew Stone, both of P.O. Box 3784, Logan, Utah 84323

[21] Appl. No.: 08/653,868

[22] Filed: May 28, 1996

[51] Int. Cl.⁶ .............................. A47J 37/00; F24C 3/00
[52] U.S. Cl. .................. 126/41 R; 126/39 R; 126/40; 126/50; 126/304 A; 248/224.8; 248/222.52; 248/250
[58] Field of Search ............................. 126/41 R, 39 R, 126/9 R, 25 R, 40, 50, 37 B; 431/266, 344; 248/222.52, 224.8, 250

[56] References Cited

U.S. PATENT DOCUMENTS

| | | | |
|---|---|---|---|
| 1,130,747 | 3/1915 | Lozano | 126/304 A |
| 1,924,824 | 8/1933 | Yeager | 126/306 |
| 2,735,702 | 2/1956 | Larson | 248/188.6 |
| 3,789,822 | 2/1974 | Schantz | 126/41 R |
| 4,726,350 | 2/1988 | Steinhauser | 126/40 |
| 4,953,534 | 9/1990 | De Gouville et al. | 431/266 |
| 5,002,036 | 3/1991 | Riehl | 431/266 |
| 5,325,841 | 7/1994 | Hooper, Sr. | 126/25 R |

*Primary Examiner*—James C. Yeung

[57] ABSTRACT

The present invention is directed to a portable stove. The portable stove comprises a body member which contains burners. The portable stove includes shelves which lock into place onto the body member during use and storage. A griddle having a heat dispersement plate is removably mounted to the body member above the burner. Legs are hingedly and slidingly attached to the body member. The legs may be folded to either a standing position or a carrying position. Accordingly, the shelves, griddle and legs may be secured to the stove during storage.

18 Claims, 11 Drawing Sheets

PORTABLE STOVE

BACKGROUND OF THE INVENTION

The present invention relates to portable cooking stoves. More particularly, the present invention relates to a portable stove which has wind resistant burners, attached folding legs, detachable shelves, and a heat dispersing griddle.

There are many types of portable cooking stoves on the market. However, some of the existing portable stoves lack durability, are difficult to use, lack wind resistant burners, do not create ideal cooking conditions or are otherwise defectively designed.

One prior art stove is the Dutro DB-60, made by Camp Chef of Logan, Utah. The apparatus is a portable stove having two low pressure burners which emit flames from orifices located on the burner top. Many existing burners are designed similarly, making them highly susceptible to being blown out by wind or breeze, especially when the heat is reduced to a suitable level for ordinary cooking. In order to effectively resist the effects of wind, the burner output must be increased to a level which creates too much heat for normal dutch oven or fry pan cooking. Finally, some existing burners do not adequately distribute heat. Such burners tend to centralize heat onto a cooking surface, creating hot spots which often result in burnt food.

The shelves on many existing portable cooking stoves are also undesirable. They are made from thin materials and do not support a substantial amount of weight. Likewise, the means for attaching those shelves to the stove frequently do not provide much support. Furthermore, attaching shelves to some existing portable stoves is often time consuming.

Third, the griddles designed for use on some existing portable cooking stoves do not properly distribute heat. Nor do the griddles of many existing stoves lock easily and securely into place. It is also difficult to remove hot griddles from many existing portable stoves.

Fourth, the folding legs of some existing portable cooking stoves are also problematic. Perhaps the greatest concern with the folding legs of some existing portable cooking stoves is their lack of stability when the stove is bumped or jarred. In addition, the folding legs of some existing portable cooking stoves are not easily locked securely into place when placed into either a standing position or a carrying position.

Fifth, in order to light many existing outdoor stoves, one must allow fuel to pass through the burner and then place a flame near the burner. Thus, lighting a burner is often difficult and potentially dangerous.

What is needed is an outdoor cooking stove that is easily and safely lit, directs the proper amount of heat onto a cooking surface, spreads the heat evenly onto the cooking surface, continues to operate in a wind or breeze, has sturdy shelves that readily lock securely into place, an easily attachable and detachable griddle which locks into place and which distributes heat evenly along its surface, and attached folding legs which lock into place in both standing and carrying positions.

SUMMARY OF THE INVENTION

The present invention comprises a portable cooking stove which addresses the foregoing needs. The outdoor stove device of the present invention is easily and safely lit. The portable stove has wind resistant burners which disperse the proper amount of heat evenly onto a cooking surface. In addition, the stove's sturdy shelves and shelf supports lock readily and securely into place during use and for storage and transportation. Similarly, the stove of the present invention has a griddle which locks readily and securely into place in both a cooking position and a raised stand-by position and can be easily removed while hot. Finally, the folding legs of the portable stove of the present invention lock securely into place in both a standing position and a carrying position.

The portable stove of the present invention provides the additional advantages of sturdiness and solid construction. Yet, when the legs are folded to carrying position, the portable stove is very compact. Thus, the outdoor stove of the present invention combines ideal cooking conditions with portability.

A preferred embodiment of the invention includes a body which contains two burners and a means for conveying fuel into the burners. Each burner is surrounded by wind retardation means. A lighting tube passes into the stove and to each burner. Four folding legs attach to the body, each having a carrying position and a standing position. The preferred legs comprise a means for attachment to the body and a means for locking. The means for attachment lock the legs into a standing position. The means for locking lock the legs into a carrying position.

Another preferred embodiment includes a body which contains three burners. Each burner is surrounded by a wind retardant bowl. The other elements of the three burner embodiment are the same as the corresponding elements of the two burner embodiment.

The preferred stoves of the present invention also include a removable griddle having a means for attachment to the stove and a handle which secure the griddle into place on the stove and at least one removable interlockdng shelf which attaches to the body during use and over the burners for storage and transportation.

Further advantages of the present invention will become apparent from a consideration of the drawings and the ensuing description.

DETAILED DESCRIPTION OF THE PREFERRED EMBODIMENTS

The present invention is directed to a portable stove which combines ideal cooking conditions with portability. The portable stove possesses the advantages of wind resistance, produces desirable amounts of heat, distributes heat evenly, has attached folding legs which lock into place, a removable griddle which attaches securely, yet can be easily removed while hot, and sturdy shelves which readily and securely attach to the stove. This combination of features make the portable stove of the present invention especially useful for outdoor cooking.

Figure 1:
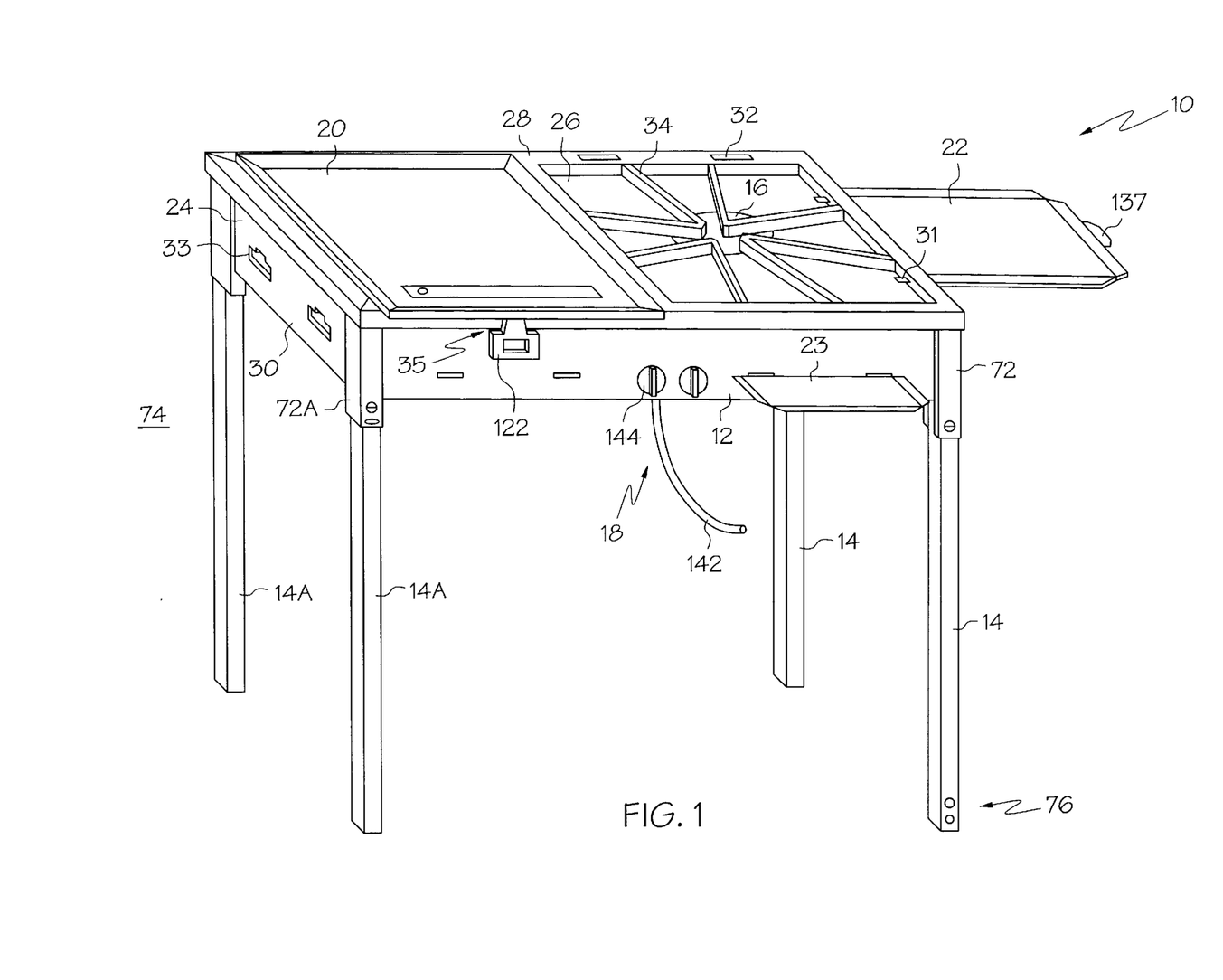
FIG. 1 is a frontal perspective view of a preferred embodiment of the present invention, with the legs folded to standing position.

Referring to FIG. 1, a portable stove 10 comprises a body 12, a plurality of long legs 14 and short legs 14A which are hingedly and slidingly attached to the body, at least one burner 16 located within the body, and a means for conveying fuel 18 to the burner, including an inlet hose 142 and at least one fuel regulator valve 144. Long legs 14 are preferably about one leg width longer than short legs 14A. The preferred stove also includes at least one griddle 20, removably attached to body 12, and shelves 22 and 23 which are also removably attached to body 12.

Body 12 contains the inner workings of and engages all other parts of the portable stove of the present invention. Body 12 is preferably made of steel, but can be manufactured from a variety of materials, including metals. The body material is preferably sturdy and withstands heat. A preferable body material also supports the stove's inner workings, attachments, and a substantial amount of weight placed thereon. Finally, a preferred body material withstands wear caused by transportation, use outdoors, and repeated heating.

Body 12 is preferably rectangular, having an outer surface 24, an inner surface 26, a top 28 and a bottom 30. Four leg engagers 72 and 72A are attached to each corner of body 12. Preferably, top 28 includes at least one attachment engagement slot 32, which engages an attachment such as a griddle or a grill. Outer surface 24 includes at least one shelf engagement slot 33. At least one pot holder 34 attaches to top 28, above burner 16. Preferably, outer surface 24 also has a lip with an indentation on the underside thereof, referred to as the griddle lock notch 35.

A means for conveying fuel 18 directs fuel from a fuel source (not shown) into stove 10. Means for conveying fuel 18 comprises a fuel inlet hose 142 and at least one fuel regulator valve 144. Fuel flows into stove 10 through inlet hose 142, past fuel regulator valve 144, which controls the flow of fuel into the stove, and into a venturi tube (not shown) which directs fuel into burner 16.

Figure 2:
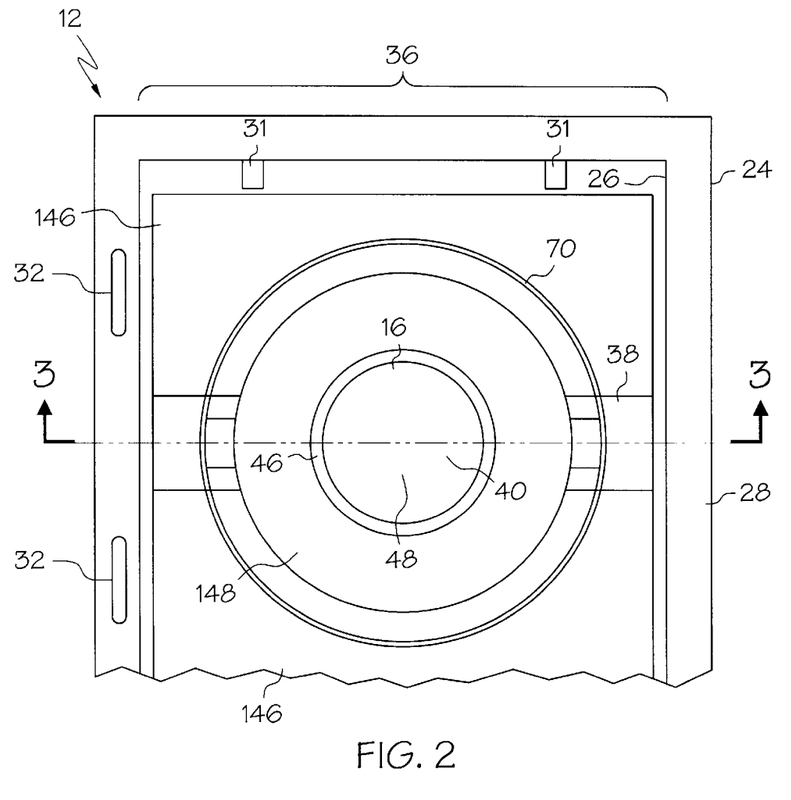
FIG. 2 is a partial top plan view of the embodiment shown in FIG. 1, not showing the pot holder.
Figure 3:
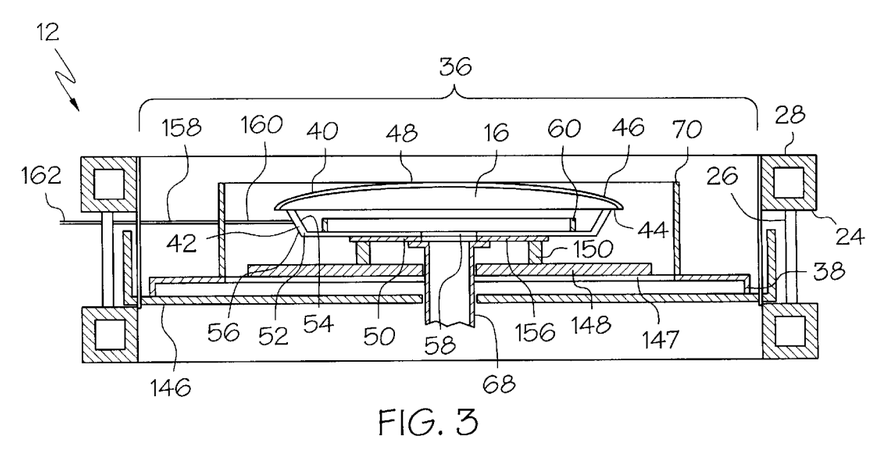
FIG. 3 is a side cross section view of FIG. 2, along line 3—3.

As shown in FIGS. 2 and 3, inner surface 26 of body 12 forms burner housing 36. With reference to FIG. 3, burner housing 36 contains an underpan 146 attached near bottom 30, at least one burner support 38 located above the underpan, at least one burner 16 which is located above the burner support, a breeze retardant ring 70 resting upon the burner support and surrounding each burner, a venturi tube 68 which passes through the underpan and the burner support and attaches to the burner to convey fuel from the fuel inlet hose (not shown) to the burner.

Underpan 146 includes at least one venturi tube slot 147 formed therethrough. Burner support 38 is located above underpan 146, and is preferably attached thereto. Preferably, a flat ring referred to as the heat shield 148 is attached to the top of burner support 38. At least one spacer 150 rests upon heat shield 148. Burner 16 rests upon spacers 150, which distance the burner from burner support 38 and heat shield 148. Preferably, the top of each spacer 150 is fixedly attached to burner 16.

Venturi tube 68 conveys fuel from the inlet hose to burner 16. Venturi tube 68 passes through venturi tube slot 147 of underpan and through the center of heat shield 148 and attaches to burner 16. A ring shaped gasket 156 is located between burner 16 and venturi tube 68 and creates a seal therebetween.

Breeze retardant ring 70 rests upon and is preferably fixedly attached to burner support 38. Breeze retardant ring 70 surrounds burner 16 in a manner that significantly restricts airflow to and around the burner.

Preferably, a lighting tube 158 passes through body 12 to an orifice 62 (shown in FIG. 5) of burne 16. The lighting tube has a receiving end 160 and a distal end 162. Receiving end 160 and distal end 162 are in fuel and flame communication with each other. Receiving end 160 is attached to an orifice 62 of burner 16. Distal end 162 passes through body 12, at a distance from burner 16. As fuel passes out of an orifice 62, it enters receiving end 160, flows through lighting tube 158, and out of distal end 162. When fuel passing out of distal end 162 is ignited, the flame passes through lighting tube 158, out of receiving end 160 and to orifice 62, igniting fuel as it flows from burner 16.

Figure 2A:
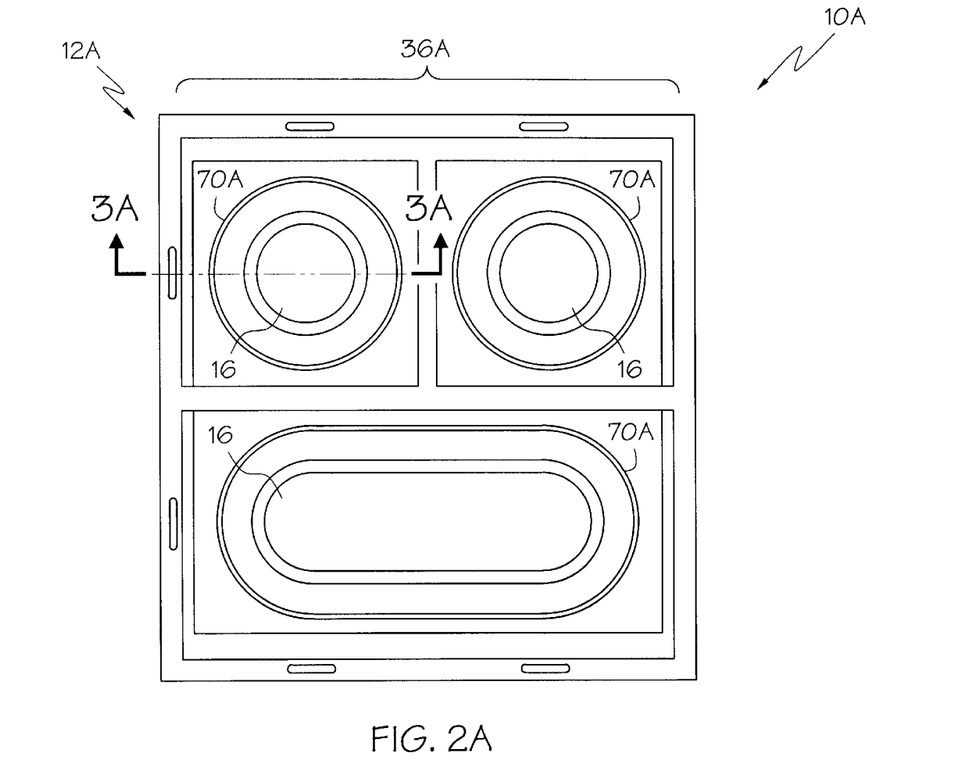
FIG. 2A is a top plan view of a preferred three burner embodiment of the present invention.
Figure 3A:
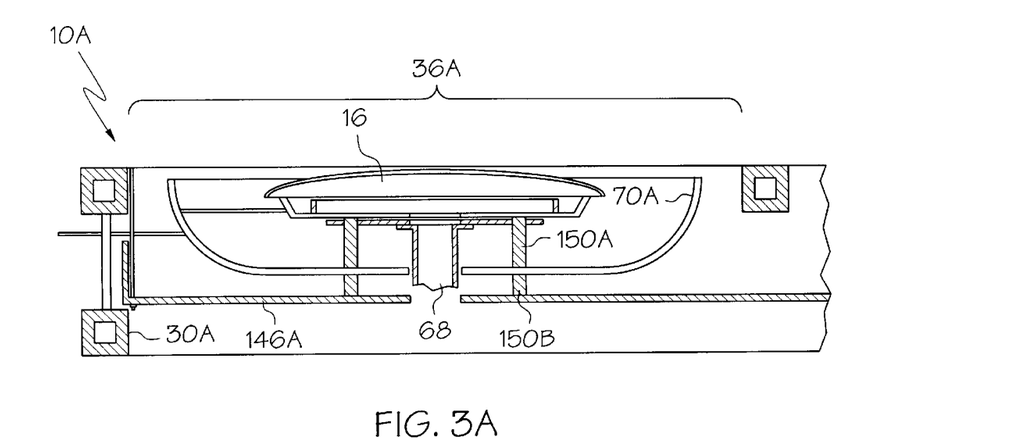
FIG. 3A is a side cross section view of FIG. 2A, along line 3A—3A.

FIGS. 2A and 3A show a second embodiment 10A of the stove of the present invention. Referring to FIG. 3A, burner housing 36A contains an underpan 146A attached near bottom 30A, at least one bowl spacer 150B located above the underpan, a breeze retardant bowl 70A resting upon the bowl spacers, at least one burner spacer 150A located within the bowl, burner assemblies 16 which rest upon burner spacers 150A and within the bowl, and a plurality of venturi tubes 68, each of which passes through the underpan and the bowl and attaches to a burner to convey fuel from the fuel inlet hose (not shown) to the burners.

Preferably, bowl 70A is made from a corrosion resistant material such as stainless steel, aluminized steel or high-quality carbon steel, but can be manufactured from a variety of heat resistant materials, including low carbon steel with an additional protective coating of enamel or glass. The remaining elements of embodiment 10A are the same as the corresponding elements of embodiment 10.

The burners project heat onto a cooking surface. When fuel passing through a burner is ignited, the flame emitted therefrom is then directed onto a cooking surface. A preferred material such as stainless steel is durable, long lasting, easily cleaned, and able to withstand repeated, sudden temperature changes.

Figure 4:
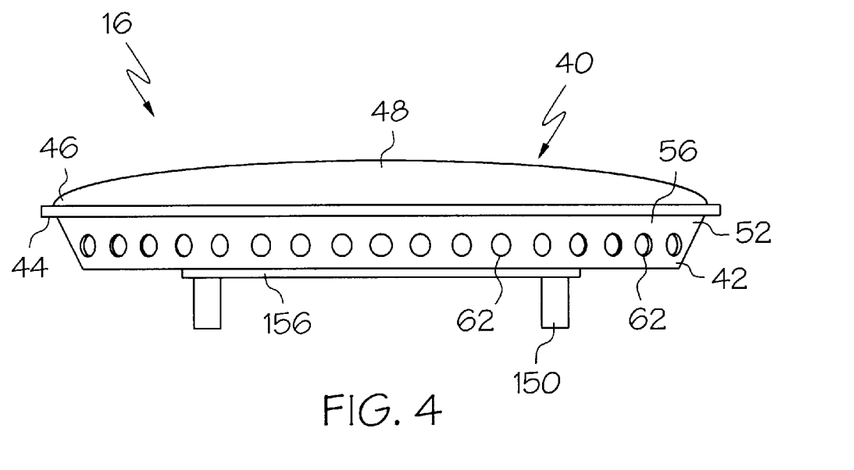
FIG. 4 is a frontal plan view of the burner of the embodiment shown in FIG. 1.
Figure 5:
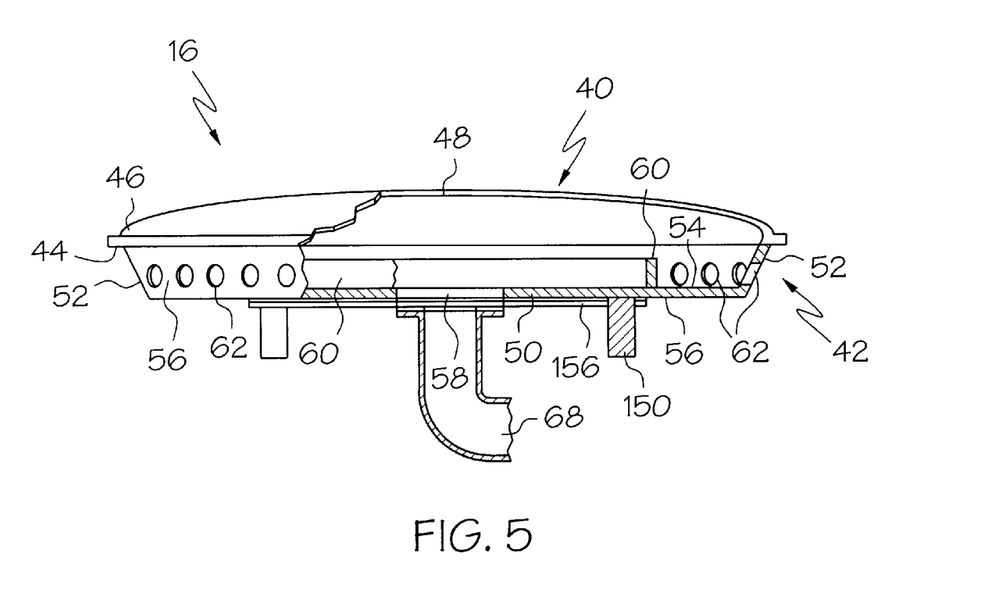
FIG. 5 is a partial frontal cutaway view of the burner of the embodiment shown in FIG. 1.

As shown in FIGS. 4 and 5, burner 16 has an cover 40 and a base 42 fixedly attached thereto. Cover 40 slopes upward, away from base 42, from an outer perimeter 46 to a center 48. With reference to FIG. 5, base 42 has a center 50, an outer perimeter 52 attached to outer perimeter 46 of cover 40, an inner surface 54, and an outer surface 56. Outer perimeter 52 has a plurality of orifices 62 formed therethrough. Preferably, outer perimeter 52 of base 42 bends upward to a substantially vertical position. Cover 40 of burner 16 preferably overhangs base 42, forming a protective rim 44. Protective rim 44 partially shields the flames emitted from orifices 62 and protects them from food drippings and other substances that would plug them up.

A fuel injection port 58 is formed in center 50 of base 42. A venturi tube 68 directs fuel from the means for conveying fuel, through each burner support 38, through gasket 156 and into fuel injection port 58 of burner 16. Fuel flows into burner 16 through fuel injection port 58 and out of the burner through orifices 62.

Base 42 further comprises an internal baffle 60 resting upon inner surface 54, extending upward toward cover 40, and surrounding fuel injection port 58. Internal baffle 60 surrounds fuel injection port 58 in a manner which allows for fuel communication from fuel injection port 58 to orifices 62. Thus, fuel flows into burner 16 through fuel injection port 58, past internal baffle 60 and out of burner 16 through orifices 62. Fuel, which is ignited after passing through orifices 62, rises around protective rim 44.

Internal baffle 60 prevents wind from blowing completely through burner 16, which shields orifices 62 at the opposite end of burner 16. Internal baffle 60 also inhibits wind from blowing out the entire flame by restricting wind access to fuel injection port 58. Thus, wind blowing out a portion of the flame emitted from burner 16 will not completely extinguish the flame. Therefore, internal baffle 60 also facilitates automatic reignition of the portion of the flame that was blown out.

With reference to FIG. 1, the burners are lit by turning fuel regulator valve 144 on, which facilitates the flow of fuel from a source (not shown), into fuel inlet hose 142. As shown in FIG. 3, fuel then flows from the fuel inlet hose, into venturi tube 68, into burner 16, out of burner through orifices 62, and through lighting tube 158. As a flame (not shown) is placed at distal end 162 of lighting tube 158, the fuel escaping therefrom is ignited. The flame passes through lighting tube 158, out of receiving end 160, and into orifice 62, where fuel is ignited as it escapes from burner 16. After fuel emitted from the burner has been ignited, cooking may begin. The flame is extinguished by closing the fuel regulator valve.

Figures 6, 7:
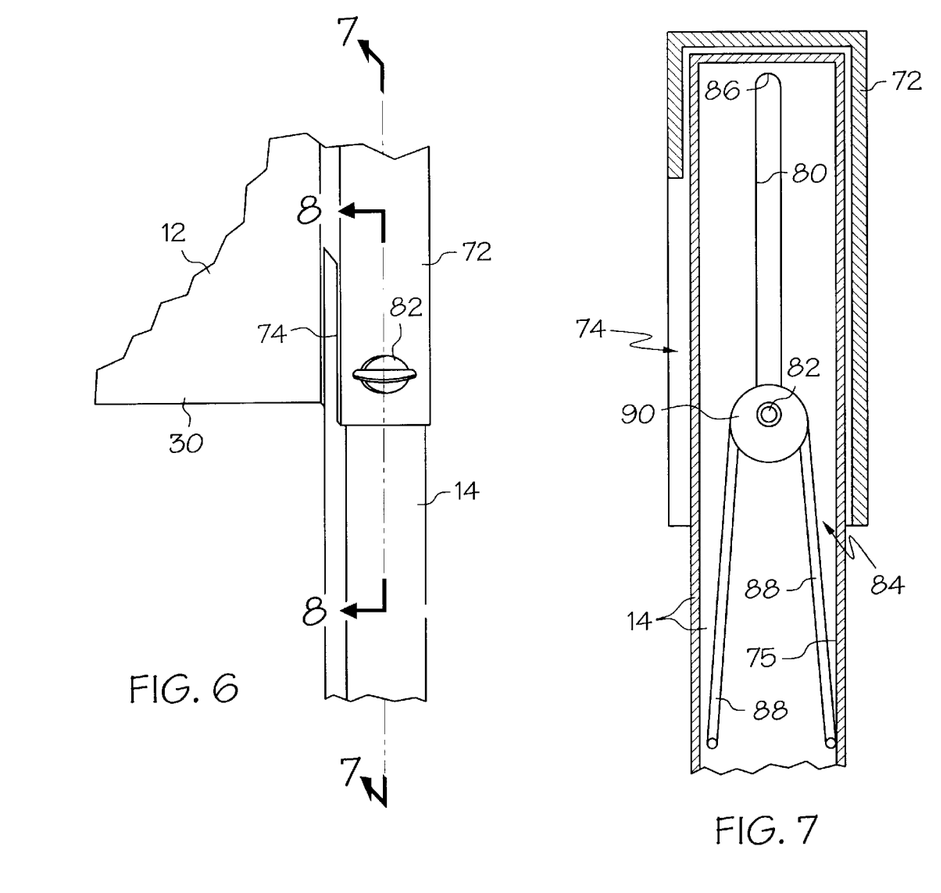
FIG. 6 is a frontal perspective view of a leg engager and a leg for use in the present invention, showing the leg attached thereto in standing position.
FIG. 7 is a frontal cross section view of FIG. 6, along plane 7—7 of the leg engager.

Referring now to FIG. 6, leg engagers 72 and 72A (not shown) fixedly attach to body 12. Preferably, body 12 has four leg engagers, two each of 72 and 72A, fixedly attached thereto near bottom 30. In the preferred embodiment, leg engagers 72 and 72A slant outward from body 12, forming a ninety-five (95) degree angle with top 28 of body 12.

Figure 8:
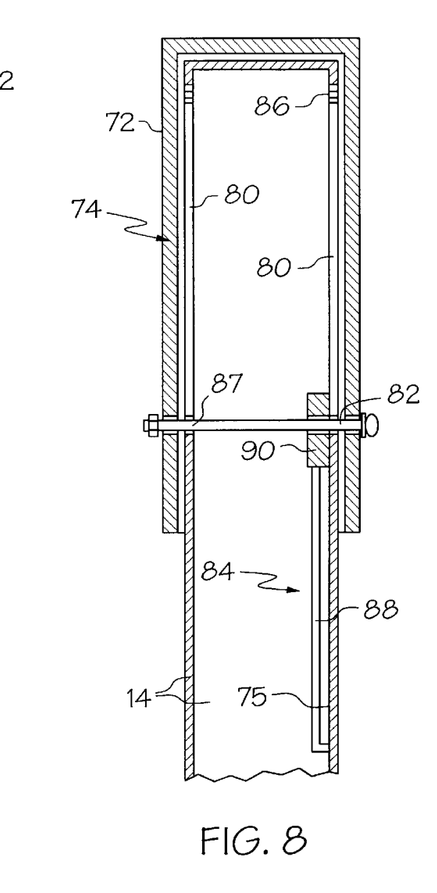
FIG. 8 is a side cross section view of FIG. 6, along plane 8—8 of the leg engager.
Figures 9, 10:
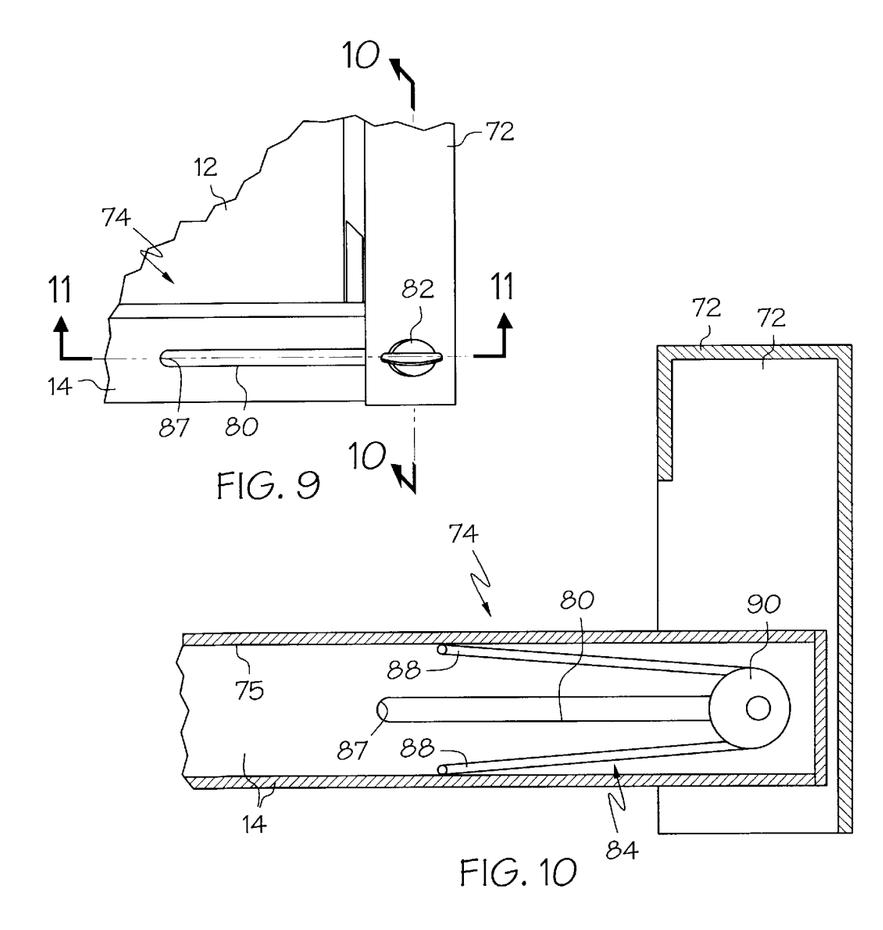
FIG. 9 is a frontal perspective view of a leg engager and a leg for use in the present invention, showing the leg attached thereto in carrying position.
FIG. 10 is a frontal cross section view of FIG. 9, along plane 10—10.
Figure 11:
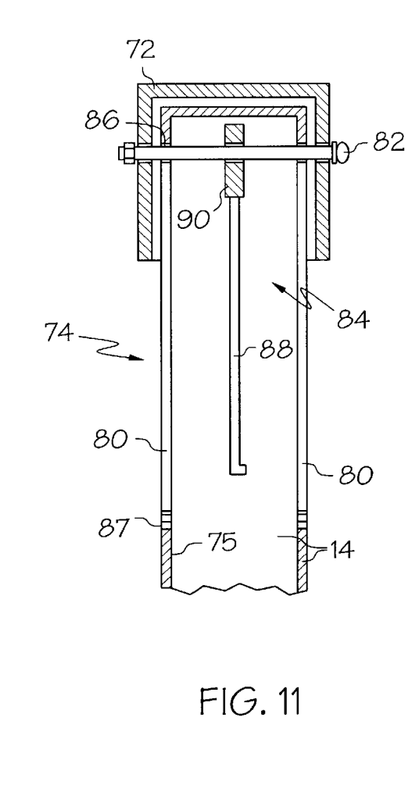
FIG. 11 is a top cross section view of FIG. 9, along plane 11—11.

Four legs, two each of leg 14 and leg 14A, each having an insertion end (74 on leg 14 and 74A on leg 14A), attach to the leg engagers, legs 14 attach to leg engagers 72 and legs 14A attach to leg engagers 72A. The insertion ends are substantially the same on both legs 14 and 14A. Therefore, unless otherwise noted, this description and the drawings refer only to insertion end 74, leg engager 72 and other common elements with a single reference number. Legs 14 and 14A have a standing position and a carrying position. FIGS. 6, 7 and 8 show a leg in standing position. FIGS. 9, 10 and 11 illustrate a leg in carrying position.

As shown in FIGS. 7 and 8, insertion end 74 hingedly and slidingly attaches to leg engager 72 by a hinge bolt 82. Leg engager 72 engages insertion end 74 when the leg is folded to standing position. When all of the legs are placed into carrying position, the stove is compact and can be easily stored and moved.

Each of the legs have an inner surface 75. Insertion end 74 preferably includes two sliders 80 formed through the front and back surfaces thereof, a tightening spring 84 located within the leg and a hinge bolt 82 passing through the sliders and the tightening spring. Sliders 80 have a carrying end 86 and a standing end 87. The sliders on leg 14 extend about one leg width further down the leg the sliders on leg 14A (not shown). Thus, on leg 14, standing end 87 of each slider 80 is located about one leg width further down the leg than the standing end of each slider on leg 14A (not shown).

With reference to FIG. 7, tightening spring 84 comprises a substantially U-shaped spring located within insertion end 74, having two arms 88 and a nut 90. Outward pressure in tightening spring 84 pushes arms 88 securely against inner surface 75 to hold tightening spring 84 in place in relation to the leg.

With reference to FIG. 8, hinge bolt 82 passes through leg engager 72, slider 80 and nut 90 to attach the leg to the body. Preferably, hinge bolt 82 is a thumbscrew which passes into leg engager 72, then into insertion end 74 through one of the slider 80, through nut 90, out of the insertion end through the other means for sliding, then out of the leg engager. When the leg is folded to standing position, it is rotated around hinge bolt 82 which is located at carrying end 86 of slider 80.

Hinge bolt 82 slides along slider 80 toward standing end 87 while holding tightening spring 84 in place in relation to body 12. Thus, insertion end 74 is inserted into leg engager 72. Arms 88 of tightening spring 84 slide along inner surface 75 as the leg is inserted into leg engager 72. Thus, tightening spring 84 secures insertion end 74 in leg engager 72.

In the preferred embodiment of insertion end 74 described above, nut 90 is threaded complementary to the thumbscrew of means for leg attachment 82. Insertion end 74 is secured within leg engager 72 by rotating hinge bolt 82 in either direction until nut 90 is secured against inner surface 75. In addition, nut 90 also forces the leg snugly against inner surface 75 of leg engager 72, which secures the leg within the leg engager. The subsequent rotation of hinge bolt 82 in the opposite direction loosens insertion end 74 by forcing it nut 90 away from inner surface 75, which in turn releases the force holding the insertion end and leg engager 72 together, facilitating removal of the leg from leg engager 72.

Leg 14 is attached to the bottom of leg engager 72. In comparison, leg 14A attaches to leg engager 72A about one leg width further up the leg engager (see FIG. 12).

The above-described mechanism provides for extreme ease in either securing legs 14 and 14A into standing position or placing them into carrying position. The legs remains attached to body 12 at all times, which reduces the amount of loose parts, thereby reducing the risk of losing parts. Yet, when legs 14 and 14A are placed in standing position, this mechanism sturdily supports the weight of the stove, its components and a significant amount of additional weight placed thereon. In addition, the length of each of the legs 14 and 14A may be adjusted along sliders 80, then secured, creating a level cooking surface on uneven terrain.

Figures 12, 13, 14, 15:
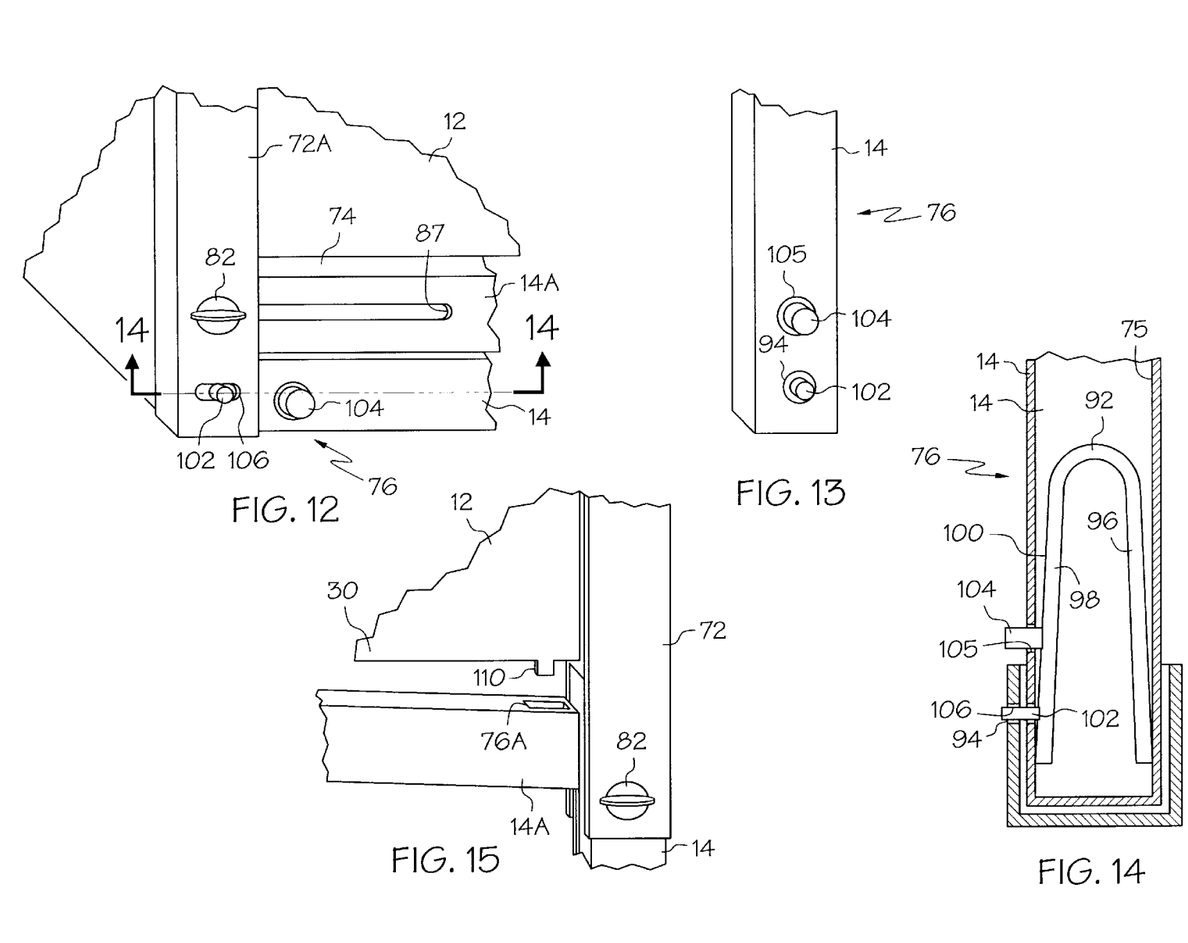
FIG. 12 is a frontal perspective view of a leg engager having a lock retainer for use in the present invention, showing the lock retainer engaging a retaining pin of leg which includes a storage lock.
FIG. 13 is a frontal perspective view a leg having a storage lock for use in the present invention.
FIG. 14 is a side cross section view of FIG. 12, through plane 14—14 of the leg engager.
FIG. 15 is a frontal perspective view of a leg having a stabilizer notch for use in the present invention, the leg being partially folded into carrying position.

Preferably, the legs also comprise either a storage lock 76, seen in FIG. 12, or a stabilizer notch 76A, shown in FIG. 15, which secure the legs while in carrying position. Leg 14 has storage lock 76 (see FIG. 12) and leg 14A has stabilizer notch 76A (see FIG. 15). As shown in FIG. 14, a first embodiment of storage lock 76 comprises a locking spring 92 and a retainer port 94. Preferably, storage locking 76 further comprises a button port 105. Locking spring 92 is a substantially U-shaped spring located within leg 14. Locking spring 92 has a support arm 96 and a locking arm 98. Both support arm 96 and locking arm 98 abut inner surface 75 of leg 14 and are held in place by outward pressure of locking spring 92. Locking arm 98 has an outer surface 100 with a retaining pin 102 located thereon.

As FIG. 12 illustrates, body 12 has at least one lock retainer 106 located near bottom 30 such that when a leg 14 having a locking spring is folded to carrying position, lock retainer 106 removably engages retaining pin 102.

Referring to FIG. 14, lock retainer 106 disengages retaining pin 102 when locking arm 98 is pushed away from inner surface 75 and toward support arm 96.

Preferably, in the first embodiment of storage lock 76 of leg 14, outer surface 100 has a button 104 located thereon. Button 104 passes through a button port 105 formed through storage lock 76. When button 104 is depressed, locking arm 98 is pushed away from inner surface 75 and toward support arm 96. Thus, retaining pin 102 moves through retainer port 94 and into storage lock 76 of leg 14. When button 104 is depressed, lock retainer 106 disengages retaining pin 102, facilitating movement of leg 14 to carrying position.

FIG. 15 illustrates stabilizer notch 76A. Body 12 has a retainer tab 110 at bottom 30 and near leg engager 72, which is placed such that when leg 14A having stabilizer notch 76A is folded into carrying position, the leg retainer engages the retainer tab, securing the leg from side to side movement while folded to carrying position.

As seen in FIGS. 12 and 15, Stabilizer notch 76A is preferably used on leg 14A when another leg 14 having storage lock 76 is folded and locked into carrying position such that it secures the first leg from unfolding to standing position. Thus, legs 14 and 14A and leg engagers 72 and 72A are preferably divided into two sets, each set having leg 14 attached to leg engager 72 and leg 14A attached to leg engager 72A. Hinge bolt 82 passes through leg engager 72 near its bottom edge. In comparison, hinge bolt 82 passes through leg engager 72A at a position about one leg width higher than on leg engager 72. Leg 14A is approximately one leg width shorter than leg 14.

The shorter leg 14A, having stabilizer notch 76A, is folded into carrying position first and is secured from side-to-side motion while in carrying position by folding and locking leg 14 into place. When leg 14A is unfolded, stabilizer notch 76A disengages retainer tab 110. Thus, as leg 14 is moved to standing position, leg 14A may then also be unfolded to standing position.

With reference to FIG. 1, in order to move the legs from carrying position to standing position, stove 10 is laid on one of its sides. Referring now to FIG. 12, storage lock 76 of leg 14 must then be unlocked. This task is accomplished by depressing button 104, which removes retaining pin 102 from lock retainer 106. Leg 14 may then be unfolded to standing position. Leg 14A may also then be unfolded to standing position. With reference to FIG. 15, as leg 14A is moved to standing position, stabilizer notch 76A disengages retainer tab 110.

After each of the legs has been unfolded to standing position, they may then be locked into place. As illustrated in FIG. 7, insertion end 74 (or 74A, not shown) is inserted into leg engager 72 (or 72A, not shown). When all of the legs have been placed in standing position, stove 10 may then be placed upon the legs. Next, the legs must be secured in standing position. The legs may be moved along slider 80 until positioned to a desired length. As shown in FIG. 8, hinge bolt 82 is then rotated in either direction until nut 90 abuts inner surface 75, and the corresponding side of insertion end 74 (or 74A) abuts the inner surface of leg engager 72 (or 72A), which prevents further rotation of the hinge bolt. When all of the legs have been secured in standing position, the stove may then be used.

In order to move the legs from standing position to carrying position, the stove must first be laid on one of its sides. The legs are then unsecured by rotating hinge bolt 82 to move insertion end 74 (or 74A) away from retainer 72 (or 72A) and nut 90 away from inner surface 75. The leg may then be removed from the leg retainer and folded to carrying position.

As shown in FIG. 12, Legs 14A are folded to carrying position first. FIG. 15 illustrates that as legs 14A are folded, stabilizer notch 76A engages retainer tab 110. Referring again to FIG. 12, legs 14 are then folded to carrying position. In order to lock legs 14 into place, button 104 must be depressed, moving retaining pin 102 into the leg. As the end of leg enters leg retainer 72A, button 104 is released and leg 14 moved until retaining pin 102 enters lock retainer 106. With reference to FIG. 14, as retaining pin 102 enters lock retainer 106, spring 92 forces the retaining pin into the lock retainer. The legs are then locked into place and the stove is ready for transport and storage.

Figure 16:
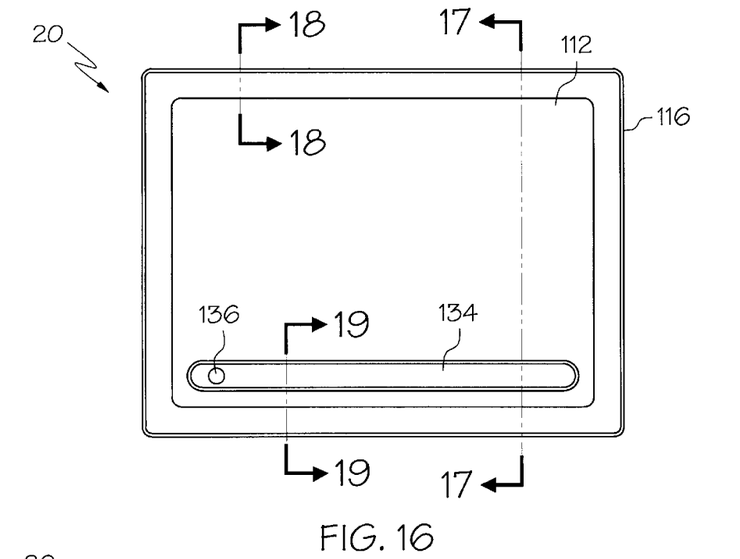
FIG. 16 is a top plan view a griddle for use with the present invention.
Figure 17:
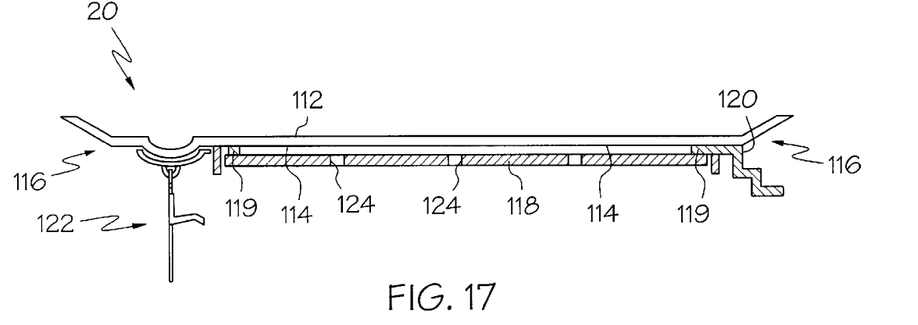
FIG. 17 is a side cross section view of FIG. 16, along line 17—17 of the griddle.

FIGS. 16–20 illustrate a preferred embodiment of griddle 20. Preferably, griddle 20 removably attaches to top 28 of body 12. As FIG. 17 shows, griddle 20 comprises a cooking surface 112, an underside 114 and an outer edge 116. Preferably, griddle 20 further comprises a heat dispersement plate 118, which is attached to underside 114; at least one attachment tab 120, which extends from underside 114 at or near outer edge 116; and a handle 122, which is hingedly attached to underside 114 at or near outer edge 116.

In a preferred embodiment of griddle 20, heat dispersement plate 118 of the griddle fixedly attaches to griddle spacers 119, which fixedly attach to underside 114 leaving a 1/16 inch gap between the heat dispersement plate and the underside. The gap may be as wide as 1/4 inch. Heat dispersement plate 118 has at least one heat dispersement notch 124 through which flame and heat enter the gap between the heat dispersement plate and underside 114. Thus, heat dispersement plate 118 provides for the even distribution of flame and heat onto underside 114. The heat is then evenly transferred to cooking surface 112.

Figure 18:
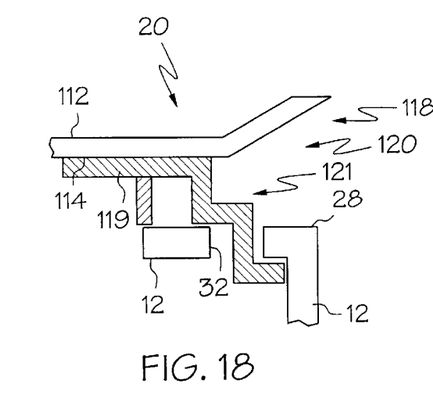
FIG. 18 is a side cross section view of FIG. 16, along line 18—18 of the attachment tab, showing the attachment tab engaged by an attachment engagement slot on the body of the present invention, the griddle in a cooking position.
Figure 18A:
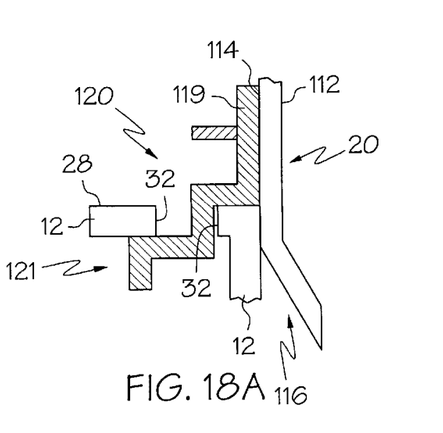
FIG. 18A is a side cross section view of FIG. 16, along line 18—18 of the attachment tab, showing the attachment tab engaged by an attachment engagement slot on the body of the present invention, the griddle in a standby position.

Referring now to FIG. 18, griddle attachment tab 120 preferably extends vertically downward from underside 114. Attachment tab 120 extends from griddle spacer 119 and bends to a substantially vertical position, extending away from griddle 20, to form insertion arm 121. In the preferred embodiment, insertion arm 121 bends horizontally away from griddle 20, parallel to the griddle, then vertically away from the griddle, then horizontally, again away from and substantially parallel to the griddle. Attachment engagement slot 32 of body 12 is preferably formed through top 28 of the body. Attachment engagement slot 32 engages insertion arm 121 of attachment tab 120 of griddle 20, holding the griddle firmly into place on top 28 when the griddle is either lowered into a horizontal cooking position over the stove or raised to a vertical standby position so that a skillet or another cooking attachment can be used over the burner, as seen in FIG. 18A. Preferably, griddle 20 has a plurality of attachment tabs 120, in order to provide for a more stable attachment of a griddle or some other attachment to body 12.

Figure 19:
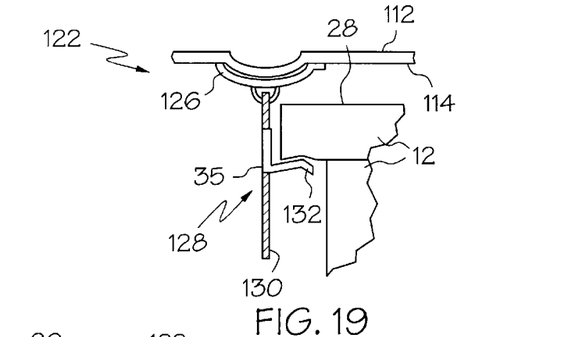
FIG. 19 is a side cross section view of FIG. 16, along line 19—19 of the handle, showing the handle attached to the stove body of the present invention.
Figure 20:
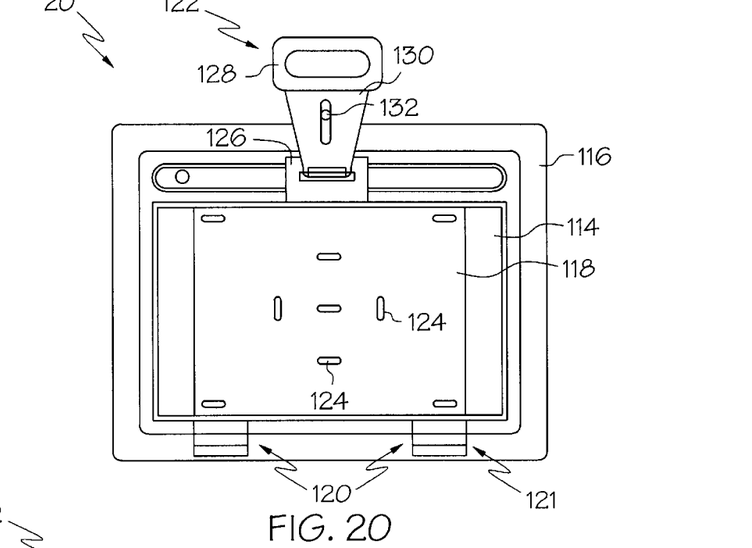
FIG. 20 is a bottom plan view of a griddle for use with the present invention.
Figure 21:
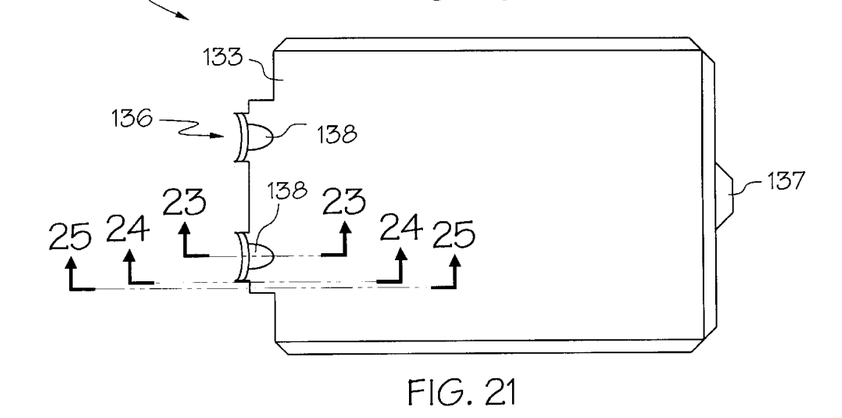
FIG. 21 is a top plan view of a shelf for use with the present invention.

With reference to FIG. 19, griddle handle 122 has a hinge end 126 and a handle end 128. Hinge end 126 attaches handle 122 to underside 114 of the griddle. Handle end 128 has a latching position and a carrying position. Handle end 128 includes an attachment surface 130 having a body engagement pin 132 extending therefrom. Body engagement pin 132 is a tension fitted spring which tightly engages griddle lock notch 35.

Handle 122 is positioned on the griddle such that when attachment engagement slot 32 of body 12 engages attachment tab 120 of the griddle, the griddle rests above the pot holder, and the handle is placed into latching position, body engagement pin 132 engages griddle lock notch 35. When body engagement pin 132 is released from lock notch 35, handle 122 may be placed in carrying position, allowing one to remove the griddle from the stove, even while the griddle is hot.

As shown in FIG. 16, cooking surface 112 of griddle further comprises a grease collection channel 134 and a drain 136 located therein. Grease collection channel 134 and drain 136 allow for self-draining of fluids from cooking surface 112 of griddle 20.

Referring now to FIG. 18A, as an example of the use of griddle 20, attachment tab 120 is inserted into attachment engagement slot 32 of the stove body. With reference to FIG. 1, griddle 20 is then laid over the stove. Next, handle 122 is locked into place by latching onto griddle lock notch 35. The burner beneath the griddle is then ignited, and heat is distributed evenly onto the cooking surface. As an appropriate temperature is achieved, cooking may begin.

With reference to FIG. 16, during cooking, grease and other fluids may be moved into grease collection channel 134 with a spatula (not shown), where they flow through drain 136 and onto the ground or a container placed thereon (not shown).

As FIG. 18A illustrates, after griddle cooking has been completed, the griddle may then be lifted to a standby position, so the burner may be used to heat other cooking devices. In the alternative, the griddle may be removed from the stove.

Figure 22:
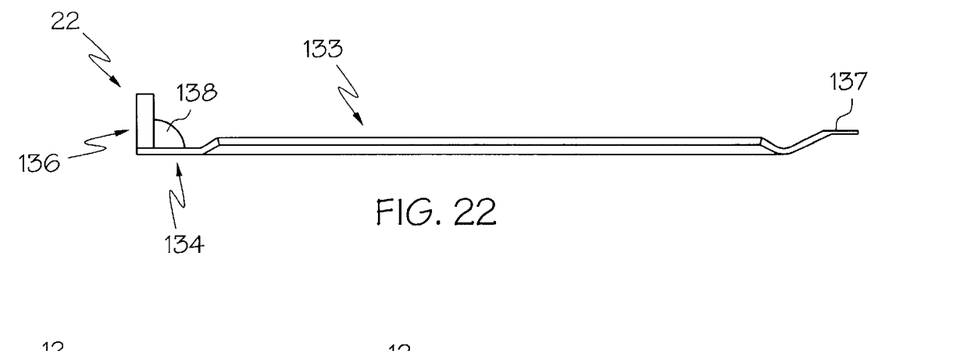
FIG. 22 is a side plan view of a shelf for use with the present invention.

FIG. 22 illustrates shelf 22, which has a top surface 133 and an engagement edge 134. At least one stove engagement tab 136 protrudes from engagement edge 134. Preferably, shelf 22 also includes a storage tab 137 extending from the edge opposite engagement edge 134.

Figure 23:
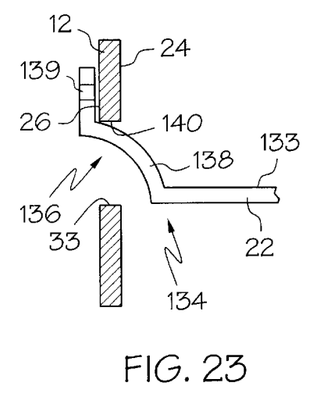
FIG. 23 is a cross section view of FIG. 21, through line 23—23 of the shelf.
Figure 24:
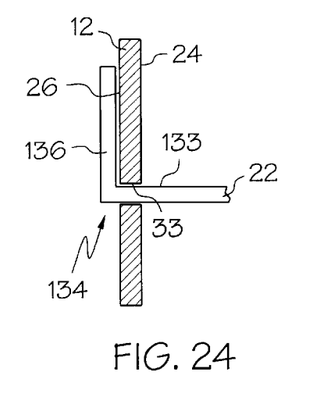
FIG. 24 is a cross section view of FIG. 21, through line 24—24 of the shelf.
Figure 25:
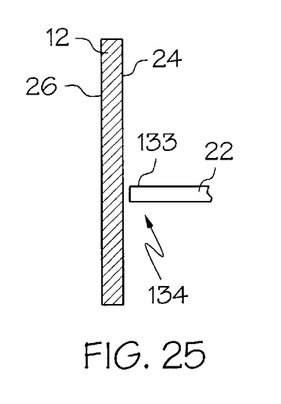
FIG. 25 is a cross section view of FIG. 21, through line 25—25 of the shelf.

FIGS. 22–24 show that each engagement tab 136 extends upward, substantially perpendicular to top surface 133. With reference to FIG. 23, when engagement tab 136 is inserted into shelf engagement slot 33 and top surface 133 of shelf 22 is placed in a substantially horizontal position, the engagement tab abuts inner surface 26 of body 12. Shelf engagement slot 33 is preferably formed through body 12, from outer surface 24 to inner surface 26. Body 12 and engagement tab 136 hold shelf 22 in place and support the weight thereof as well as a substantial amount of weight placed upon the shelf.

Figure 26:
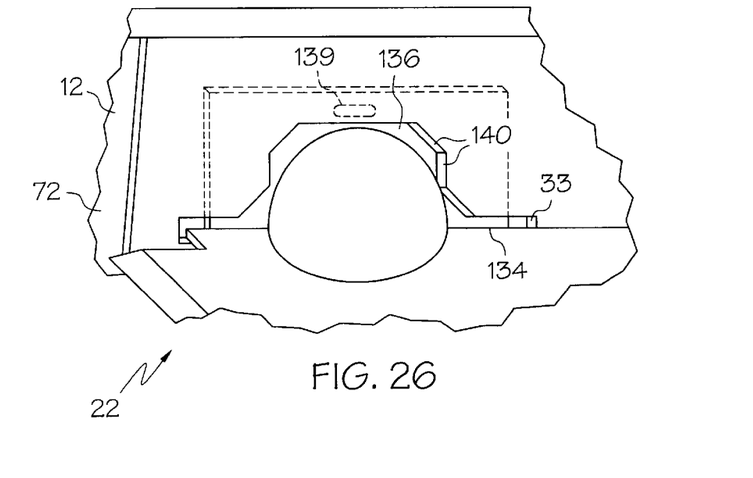
FIG. 26 is an perspective view of the engagement tab of the shelf for use with the present invention, showing the engagement tab engaged by a shelf engagement slot.

Engagement tab 136 of shelf 22 includes a shelf lock 138, which secures the shelf into place. As shown in FIG. 26, a shelf lock slot 140 is located on body 12 near shelf engagement slot 33 in such a manner that when the shelf engagement slot receives engagement tab 136, the shelf lock slot will engage shelf lock 138. Preferably, shelf lock 138 protrudes from engagement tab 136 overtop surface 133 of shelf 22. When shelf 22 is attached to body 12, as described above, shelf lock 138 and shelf lock slot 140 restrict any side-to-side movement of the shelf.

A storage slot 139 is preferably formed through each engagement tab 136, above shelf lock 138.

Figure 27:
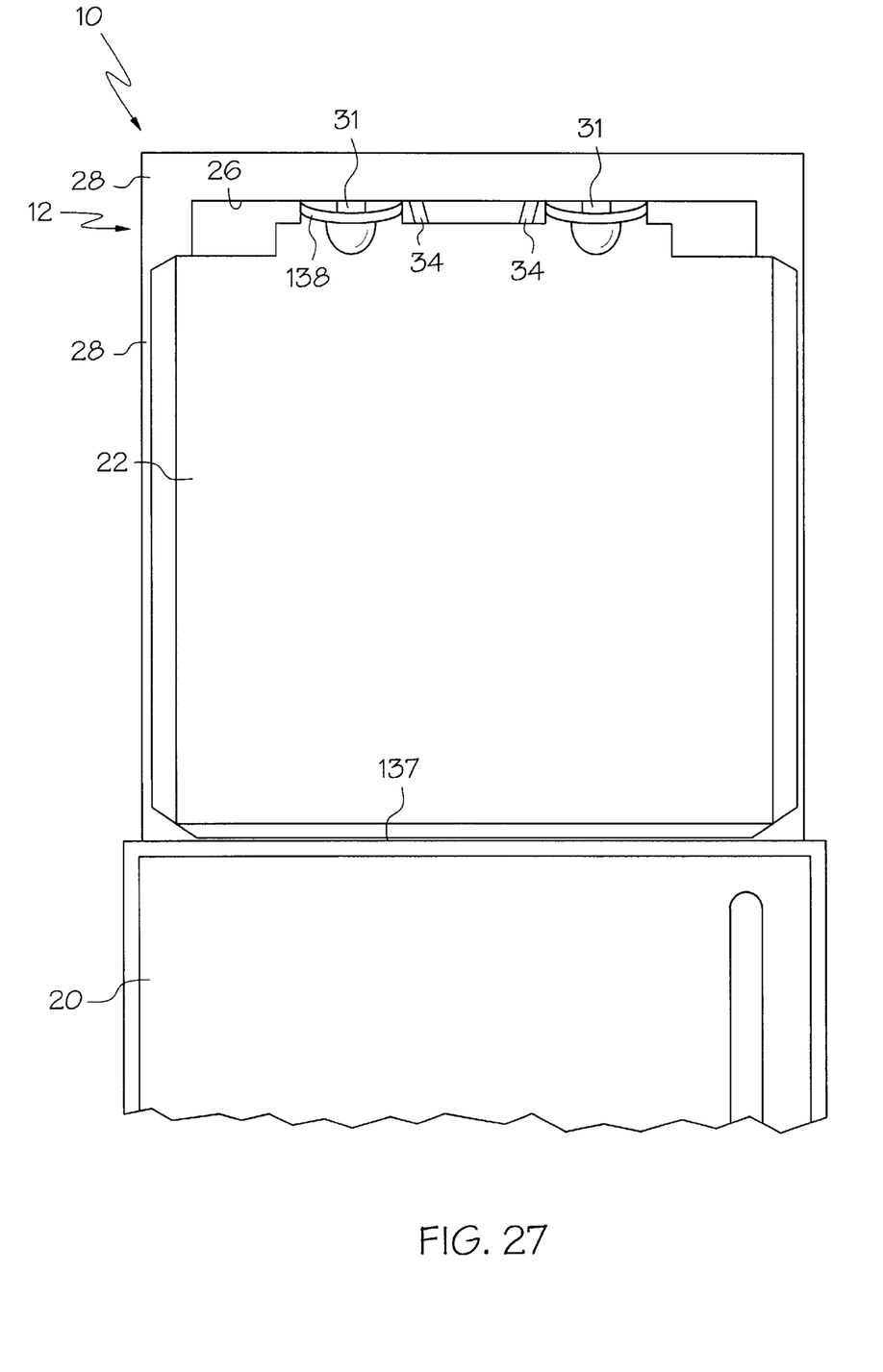
FIG. 27 is a top plan view of the embodiment shown in FIG. 1, with the shelves locked onto the stove in a storage position.

With reference to FIG. 27, shelves 22 are stored on top 28. Shelves 22 are stacked upon each other and turned up-side down. The storage slots formed through engagement tabs 136 receive shelf storage tabs 31, which protrude from inner surface 26 near top 28 of the side of stove 10. Shelves 22 are laid over pot holder 34 and engagement tabs 136 are slid against inner surface 26. Griddle 20 is then attached and secured to the stove over storage tabs 137, locking the shelves into a storage position on the stove.

Referring now to FIG. 1, as an example of the use of the portable stove of the present invention, one would first place the back side of stove 10 on the ground. Legs 14 are then released from carrying position and unfolded to and secured in standing position. Next, legs 14A are released from carrying position and unfolded to and secured in standing position. Griddle handle 122 is then released from the stove and the griddle is raised to standby position, as seen in FIG. 18A. Shelves 22 and 23 are removed from their storage positions, shown in FIG. 27, and attached to the stove. Referring again to FIG. 1, fuel regulator valves 144 are turned on to allow fuel to pass from a fuel source (not shown), into fuel inlet hose 142, and to at least one of the burners 16. The fuel is then ignited as it passes out of the burners. The desired cooking instruments are then placed over the burners that are in use, and cooking may begin.

After cooking has been completed, shelves 22 and 23 are removed from the stove and placed in their respective storage positions. As seen in FIG. 27, shelves 22 are stacked on each other and positioned by receiving tabs 31 and pot holder 34. Shelves 23 are stacked and placed over the other burner (not shown). Griddle 20, is then placed in cooking position over shelves 23 and secured to stove 10, which holds shelves 22 securely in storage position. Stove 10 is then placed on its back side. Legs 14A are released from standing position and folded to carrying position (not shown). Legs 14 are then released from standing position, folded to carrying position and locked onto the stove by storage lock 76. Portable stove 10 is then easily transported and stored.

Although the description contains many specificities, these should not be construed as limiting the scope of the invention, but as merely providing illustrations of some of the presently preferred embodiments of this invention. For example, the portable stove described illustrates a stove having several features. However, different combinations of these features and several more are embodiments of each feature are readily conceivable. Likewise, the elements of the portable stove may be constructed from any material that will fulfill the stated purpose and retain the functionality of each element.

Thus the scope of the invention should be determined by the appended claims and their legal equivalents, rather than by the examples given.

What is claimed is:

1. A portable stove comprising:
   (a) a body member having a housing;
   (b) at least one burner within the housing;
   (c) means for injecting fuel to the burner;
   (d) at least one leg hingedly and slidingly attached to the body member, the leg comprising a insertion end, the leg being movable to either a standing position or a carrying position; and
   (e) spring means for securing the insertion end of the leg in the standing position with a predetermined amount of friction.

2. The portable stove of claim 1 wherein the securing means comprises at least one member for slideably receiving the insertion end of the leg.

3. The portable stove of claim 1 wherein said insertion end of the leg further comprises at least one means for sliding comprising a carrying end and a sliding end, the means for sliding being located along the insertion end and being formed therethrough.

4. The portable stove of claim 1 wherein said body member further comprises at least one retainer tab.

5. The portable stove of claim 4 wherein said leg further comprises a retaining means having a leg retainer thereon, the retainer tab of the body engaging the leg retainer when the leg is placed into carrying position.

6. A portable stove comprising:
   (a) a body member having a housing;
   (b) at least one burner within the housing;
   (c) means for injecting fuel to the burner;
   (d) at least one leg hingedly and slidingly attached to the body member, the leg comprising a insertion end, the leg being movable to either a standing position or a carrying position;
   (e) means on the body member for securing the insertion end of the leg in the standing position;
   (f) the insertion end of the leg further comprises at least one means for sliding comprising a carrying end and a sliding end, the means for sliding being located along the insertion end and being formed therethrough; and further comprising a tightening spring comprising two arms and a nut, the tightening spring being located within the insertion end of the leg along the means for sliding, the arms springedly abutting the inner surface of the leg and holding the tightening spring snugly in place therein.

7. The portable stove of claim 6 and further comprising a means for body attachment passing through the means for sliding and the nut of the tightening spring.

8. The portable stove of claim 7 wherein said insertion end has two means for sliding, the means for body attachment passes into the insertion end of the leg through one of the means for sliding, through the nut, then out of the leg through the other means for sliding.

9. The portable stove of claim 6 wherein the means for body attachment is threadably attached through the nut and provided with a means for manual rotation to clampedly fix the distance of insertion of the leg into the means for body attachment.

10. A portable stove comprising:
    (a) a body member having a housing;
    (b) at least one burner within the housing;
    (c) means for injecting fuel to the burner;
    (d) at least one leg hingedly and slidingly attached to the body member, the leg comprising a insertion end, the leg being movable to either a standing position or a carrying position;
    (e) means on the body member for securing the insertion end of the leg in the standing position;
    (f) the body member further comprising at least one lock retainer; and
    (g) said leg further comprising a retaining means comprising:
        (1) a retainer port formed through the inner surface of the leg; and
        (2) a locking spring having a support arm and a locking arm, the locking arm having a retaining pin thereon, the locking spring being located within the retaining means, the support arm and the locking arm springedly abutting the inner surface of the leg, the retaining pin passing through the retainer port and engaging the lock retainer of the body member when the leg is placed into the carrying position.

11. The portable stove of claim 10 wherein said retaining means further comprises a button port formed therethrough and a button extending from the locking arm, the button passes through the button port.

12. A portable stove comprising:
    (a) a body member having a housing with an outer surface;
    (b) at least one burner within the housing;
    (c) means for injecting fuel to the burner;
    (d) at lease one shelf engagement slot on the outer surface of the body member;
    (e) at least one shelf having a means for removably engaging the shelf engagement slot comprising an engagement tab which inserts into the shelf engagement slot; and
    (f) said outer surface of the body member having at least one lock slot thereon, the lock slot being located near the shelf engagement slot.

13. The portable stove of claim 12 wherein said engagement tab has a means for locking which inserts into the lock slot.

14. A portable stove comprising:
    (a) a body member having a housing;
    (b) a at least one burner within the housing having a baffle within the burner disposed to shield a flame emitted from the burner from wind flow across the burner;

c) means for injecting fuel to the burner;

(d) a top having an outer perimeter and a center; and (e) a bottom comprising:
  (1) an outer perimeter having a plurality of orifices formed therethrough, the outer perimeter fixedly attached to the outer perimeter of the top;
  (2) an inner surface comprising a fuel injection port formed therethrough, the baffle extending vertically upward therefrom and surrounding the fuel injection port; and
  (3) the plurality of orifices being positioned principally below the top of the baffle.

15. The portable stove of claim 14 wherein said outer perimeter of the top forms a protective rim which overhangs the bottom.

16. The portable stove of claim 14 and further comprising a wind retardant means surrounding the burner.

17. A portable stove comprising:

(a) a body member having a housing;

(b) at least one burner within the housing;

(c) means for injecting fuel to the burner;

(d) at least a first and a second leg each separately hingedly and slidingly attached to the body member, each leg comprising an insertion end, each such leg being movable to either a standing position or a carrying position;

(e) first means on the body member for securing the insertion end of the first leg in the standing position and second means on the body member for securing the insertion end of the second leg in the standing position; and (f) wherein the support end of the first leg engages the means on the body member for securing the insertion end of the second leg when the first leg is in the carrying position.

18. The portable stove of claim 17 wherein the second leg:

(a) is positioned between the body member and the first leg when in the carrying position; and (b) is restrained from side to side motion by a retainer on the body member.

* * * * *